(12) United States Patent
Logan et al.

(10) Patent No.: US 6,848,725 B2
(45) Date of Patent: Feb. 1, 2005

(54) THERMAL EXPANSION CONNECTION FOR RIGID PIPES

(75) Inventors: Dan T. Logan, Freemont, IN (US); Wallace B. Morehouse, Clinton, TN (US); Walter J. Matt, Clinton, TN (US); Steven E. Yates, Fort Wayne, IN (US)

(73) Assignee: DWWS, LLC, Fort Wayne, IN (US)

( * ) Notice: Subject to any disclaimer, the term of this patent is extended or adjusted under 35 U.S.C. 154(b) by 61 days.

(21) Appl. No.: 10/412,119

(22) Filed: Apr. 11, 2003

(65) Prior Publication Data

US 2004/0201214 A1 Oct. 14, 2004

(51) Int. Cl.⁷ .............................................. F16L 13/14
(52) U.S. Cl. ...................... 285/382; 285/351; 285/347; 285/187; 29/508; 29/516
(58) Field of Search ................................. 285/351, 187, 285/347, 381.1, 382, 382.7; 29/508, 516

(56) References Cited

U.S. PATENT DOCUMENTS

| | | | |
|---|---|---|---|
| 3,211,476 A | | 10/1965 | Wagner |
| 3,584,902 A | * | 6/1971 | Vyse ........................... 285/305 |
| 4,055,359 A | * | 10/1977 | McWethy ..................... 285/39 |
| 4,330,924 A | * | 5/1982 | Kushner et al. .............. 29/458 |
| 4,715,624 A | * | 12/1987 | Frye ............................. 285/55 |
| 4,807,913 A | * | 2/1989 | Bartholomew ............... 285/369 |
| 4,850,621 A | * | 7/1989 | Umehara ..................... 285/322 |
| 4,993,756 A | * | 2/1991 | Bechu ......................... 285/319 |
| 5,094,494 A | * | 3/1992 | McConnell .................. 285/318 |
| 5,190,323 A | | 3/1993 | Oetiker |
| 5,207,460 A | | 5/1993 | Oetiker |
| 5,295,718 A | | 3/1994 | Bartholomew |
| 5,380,050 A | | 1/1995 | Sanders et al. |
| 5,749,138 A | * | 5/1998 | Usui et al. .................... 29/516 |
| 5,775,740 A | | 7/1998 | Fukaya et al. |
| 5,794,982 A | | 8/1998 | Green et al. |
| 5,816,626 A | * | 10/1998 | Anderson et al. ........... 285/318 |
| 5,890,287 A | * | 4/1999 | Fukaya ..................... 29/890.14 |
| 5,918,914 A | * | 7/1999 | Morris ........................ 285/351 |
| 5,975,587 A | * | 11/1999 | Wood et al. .................. 285/15 |
| 6,053,537 A | * | 4/2000 | Guest ..................... 285/148.19 |
| 6,099,045 A | * | 8/2000 | Pirona ......................... 285/256 |
| 6,286,556 B1 | * | 9/2001 | Kato ........................... 138/109 |
| 6,286,877 B1 | | 9/2001 | Mendoza et al. |

* cited by examiner

Primary Examiner—James M. Hewitt
(74) Attorney, Agent, or Firm—Pitts & Brittian PC

(57) ABSTRACT

A thermal expansion connection for rigid pipes in low-pressure applications subject to thermal expansion and shrinkage. The connection is formed between the distal end of a first rigid pipe received within the proximal end of a second rigid pipe. At least one seal is disposed between the first and second rigid pipes to prevent fluid communication through the connection. The second rigid pipe defines a collar at the proximal end thereof for receiving the distal end of the first rigid pipe and the seals. The first rigid pipe distal end defines a radial recess for receiving and maintaining the position of each seal. A gap is defined between the first rigid pipe distal end and the second rigid pipe collar to allow for thermal expansion and contraction of the first and second rigid pipes.

9 Claims, 4 Drawing Sheets

THERMAL EXPANSION CONNECTION FOR RIGID PIPES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to the field of pipe joining. More particularly, the present invention is related to a pipe joint construction wherein two rigid pipe sections are joined in a manner such as to allow for thermal expansion without detriment to the integrity of the joint.

2. Description of the Related Art

In the field of coupling devices, it is well known that there are many ways to accomplish the coupling of two conduits. These methods vary not only for various applications such as low pressure versus high pressure, but also for the materials from which the two conduits are fabricated. For applications of coupling devices for coupling a rigid pipe, such as fabricated from a metal composite, to a flexible pipe, such as plastic or rubber, several different devices have been used heretofore. For example, one construction for connecting rigid pipes to allow thermal expansion incorporates bellows. The bellows expand and contract as the temperature increases and decreases.

Other devices have been provided for joining various types of fluid conduits in an end-to-end fashion. Typical of the art are those devices disclosed in the following U.S. Patents:

| U.S. Pat. No. | Inventor(s) | Issue Date |
|---|---|---|
| 3,211,476 | J. B. Wagner | Oct. 12, 1965 |
| 5,190,323 | H. Oetiker | Mar. 2, 1993 |
| 5,207,460 | H. Oetiker | May 4, 1993 |
| 5,295,718 | D. D. Bartholomew | Mar. 22, 1994 |
| 5,380,050 | J. D. Sanders et al. | Jan. 10, 1995 |
| 5,775,740 | K. Fukaya et al. | Jul. 7, 1998 |
| 5,794,982 | H. J. Green et al. | Aug. 18, 1998 |
| 6,286,877 | R. Mendoza et al. | Sep. 11, 2001 |

Of these patents, Wagner ('476) teaches a coupling for use in connecting fluid conduits such as flexible hose, tubing or pipe for handling liquids or gases under pressure or in a vacuum. In this device, a tubular member having a series of radial recesses at one end is received on a threaded tube having an expansion head. The expansion head is aligned with the radial recesses of the tubular member. This assembly is then inserted into a flexible hose, with the expansion head being inserted first. A coupling is then received over the end of the hose, with the threaded tube extending through the coupling. The threaded tube is then engaged to draw the expansion head into the tubular member to expand the radius proximate the radial recesses. The material between the recesses then protrudes into and thereby compresses the hose between the tubular member and the coupling.

Oetiker, in the '323 patent, discloses a high pressure coupling for hoses. The '323 coupling includes a head portion having a "connecting nipple portion" and a "nipple portion" extending in opposite directions from the head portion. A sleeve member made is adapted to be securely connected to the nipple structure by crimping, flanging or the like. The nipple portion includes outwardly projecting, rounded-off ribs cooperating with rounded-off grooves in the sleeve member. The sleeve member is received on a hose and the nipple portion of the coupling is inserted into the hose. The nipple portion is then expanded and the sleeve member compressed such that the hose inserted between the nipple portion and the sleeve member is held securely in position. Oetiker discloses a similar coupler in his '460 patent listed above, as well.

Bartholomew, in the '718 patent, discloses several embodiments of a fitting for positioning on the terminal end of a flexible conduit. The fitting includes a first member positioned on the exterior surface of the terminal end of a conduit, a second member positioned on the interior surface of the terminal end of the conduit, and a connector member coupled with either the first or second member. The first and second members are securely affixed by expanding the diameter of the second member outwardly against the first member to achieve a pressure fit.

Sanders et al., in their '050 patent, disclose a coupling for a tubular hose. The inner peripheral surface of the tubular hose includes an inner corrugated hose made of polymeric material and defines inwardly convex projections extending from one end of the tubular hose to the other end thereof. The coupling includes an insert disposed in the one end of the tubular hose and then radially outwardly expanded into sealing relation with the inner corrugated hose. The insert defines an outer peripheral surface defined by a plurality of outwardly convex projections disposed between the projections of the inner hose, whereby the interior of the tubular hose is substantially sealed to the interior of the coupling.

Fukaya et al., in their '740 patent, disclose a joint structure for joining a small-diameter thin metal tube with a pressure rubber hose. The joint structure of the '740 device is similar to that of Oetiker ('460). Fukaya et al. further disclose a short inner tube inserted into a metal tube in order to define a double wall construction received within the tubular hose.

Green et al. ('982) disclose a method for installing a liner in a metal pipe. A liner is pulled through the pipe, is cut back to the correct position, and a socket clamp or pin clamp is inserted within the liner to hold the liner in place against the interior of the metal pipe. Green et al., teach this method for both male and female portions of a pipe connector such that a continuous liner is formed when male and female portions are engaged.

Finally, Mendoza et al. ('877) disclose a dual seal pipe coupling having cooperating male and female pipe fittings formed on adjacent ends of a pair of conduit members. The male and female pipe fittings define cooperating threads by which they are mated. A pair of seal rings is provided to prevent fluid communication between the pipe fittings under high pressures. At least one of the pair of seal rings is vented at low pressure to prevent pressure build-up and potential seal ring distortion or damage upon initial assembly of the pipe fittings.

BRIEF SUMMARY OF THE INVENTION

The present invention is a thermal expansion connection for rigid pipes. The thermal expansion connection is provided for low-pressure applications subject to thermal expansion and shrinkage such as with caustic gases and diesel gas exhaust.

Generally, the connection is formed between the distal end of a first rigid pipe received within the proximal end of a second rigid pipe. The proximal end of the second rigid pipe is dimensioned relative to the distal end of the first rigid pipe such that a gap is defined therebetween. At least one seal is disposed between the first and second rigid pipes to prevent fluid communication through the gap.

Each of the first and second rigid pipes defines a first nominal diameter. The second rigid pipe defines a collar at the proximal end thereof. The collar defines a second diameter, larger than the first diameter in order to receive the distal end of the first rigid pipe and the seals.

In one embodiment, the distal end of the first rigid pipe defines a radial recess for receiving and maintaining the position of each seal. In an alternate embodiment, the distal end of the first rigid pipe defines a plurality of radial beads, with a radial recess defined between a pair of spaced apart radial beads. In either embodiment, the depth of each radial recess is approximately equal to the radius of the seal when in an uncompressed state.

The connection of the present invention is constructed by placing a seal within each radial recess of the first rigid pipe. The distal end of the first rigid pipe is inserted into the collar of the second rigid pipe, after which the collar is swaged. As the collar is being swaged, each seal is compressed. In the first embodiment, the proximal end of the second rigid pipe terminates in an outwardly extending flange. In the alternate embodiment, the second rigid pipe proximal end terminates in an inwardly extending flange, whereby removal of the first rigid pipe from within the second rigid pipe is prevented.

A gap is defined between the distal end of the first rigid pipe and the collar of the second rigid pipe, both before and after swaging of the collar. The gap allows for thermal expansion and contraction of the first and second rigid pipes. Linear movement between the first and second rigid pipes is limited only by the compressed seals.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A thermal expansion connection for rigid pipes is provided in the present invention. The thermal expansion connection is illustrated at 10 in the figures. The thermal expansion connection, or connection 10, is provided for low-pressure applications subject to thermal expansion and shrinkage such as with caustic gases and diesel gas exhaust.

Figure 1:
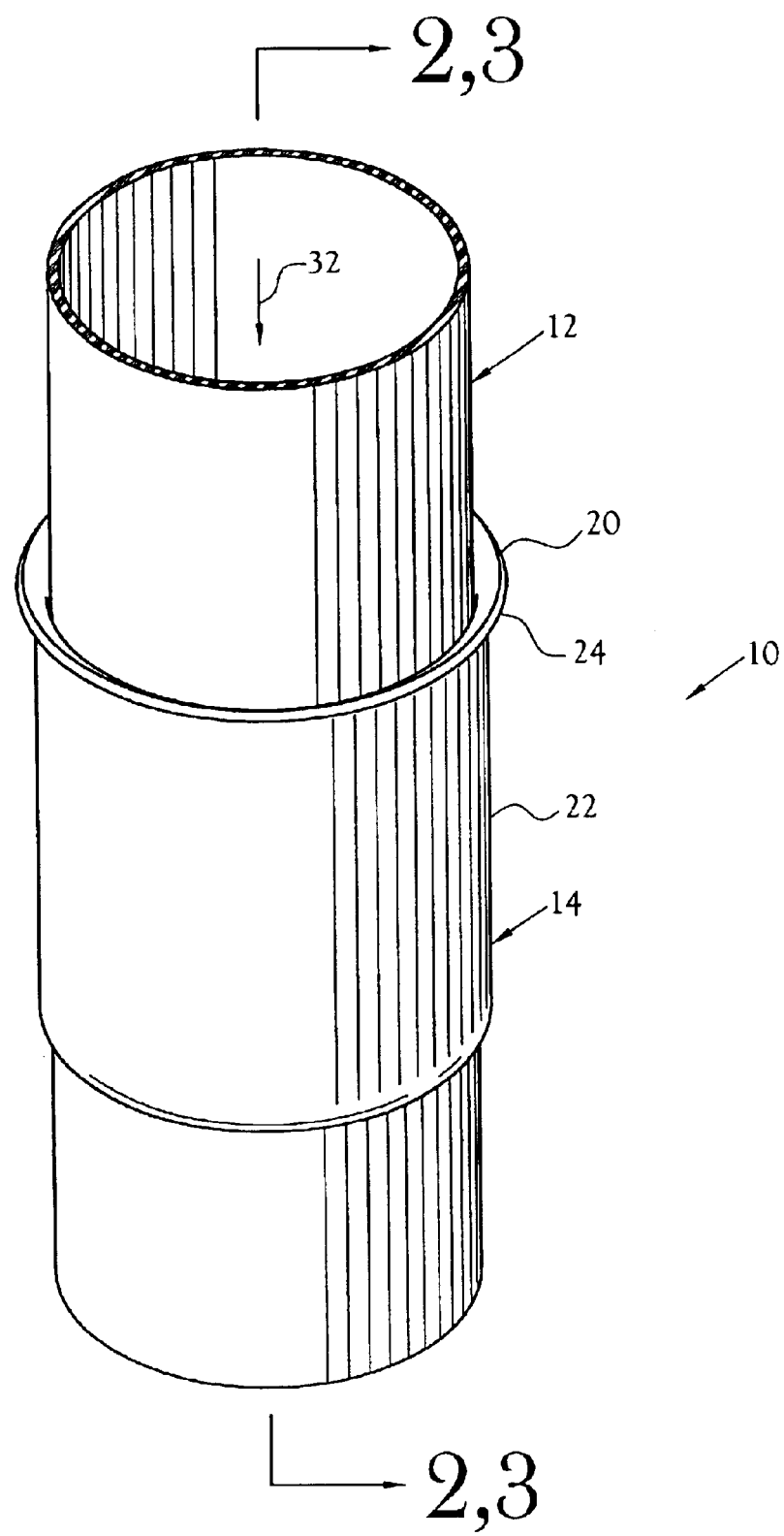
FIG. 1 is a perspective illustration of the thermal expansion connection for rigid pipes constructed in accordance with several features of the present invention.
Figures 2, 3:
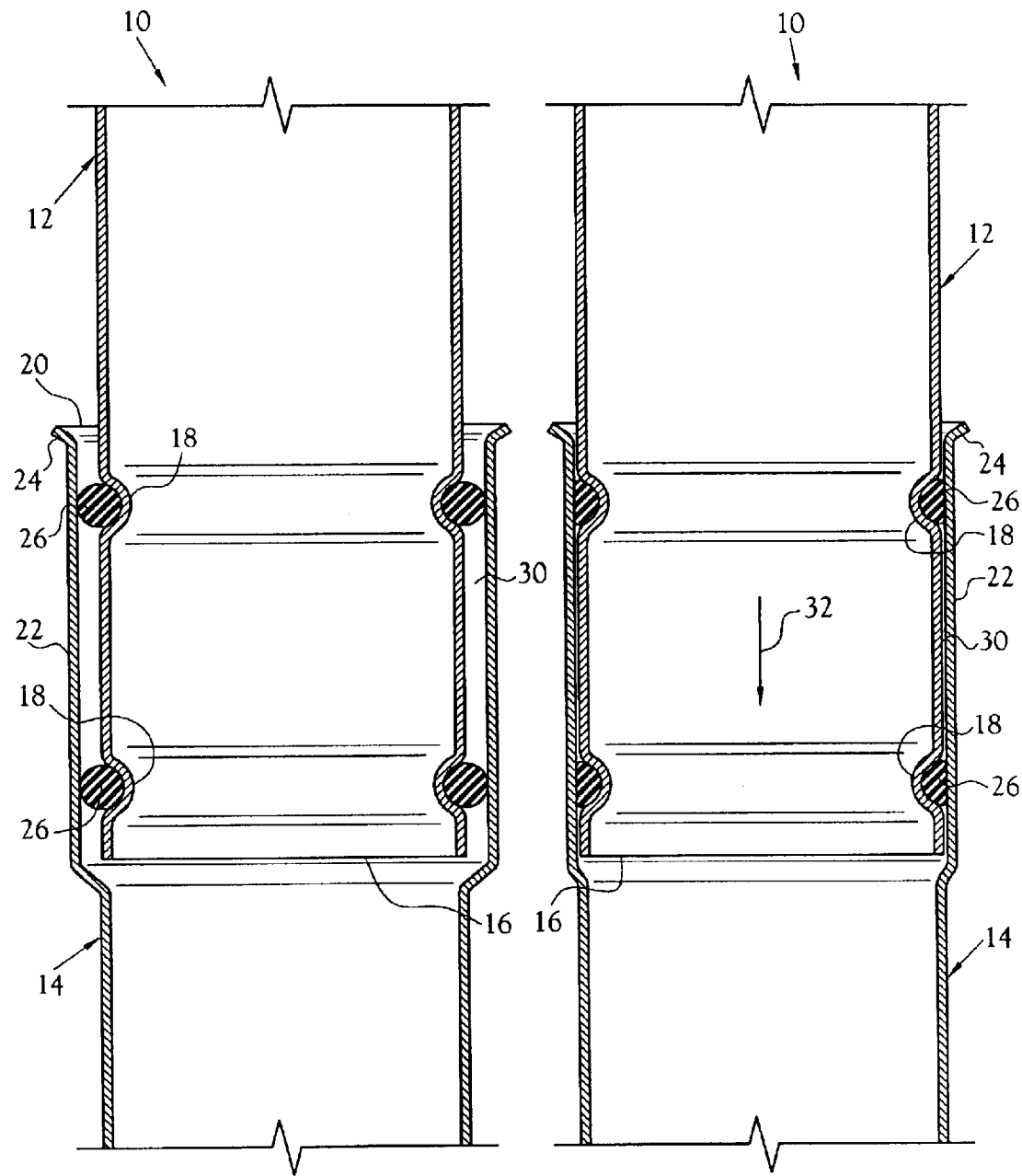
FIG. 2 is an elevation view, in section taken along lines 2—2 of FIG. 1, of the thermal expansion connection of the present invention.
FIG. 3 is an elevation view, in section taken along lines 3—3 of FIG. 1, of the thermal expansion connection of the present invention.

Illustrated in FIGS. 1–3 is one embodiment of the present invention. Generally, the connection 10 is formed between the distal end 16 of a first rigid pipe 12 and the proximal end 20 of a second rigid pipe 14. As best illustrated in FIGS. 2 and 3, the distal end 16 of the first rigid pipe 12 is received within the proximal end 20 of the second rigid pipe 14. The proximal end 20 of the second rigid pipe 14 is dimensioned relative to the distal end 16 of the first rigid pipe 12 such that a gap 30 is defined therebetween. At least one seal 26 is disposed between the first and second rigid pipes 12,14 to prevent fluid communication through the gap 30. As illustrated by the direction arrow 32, the direction of flow through the connection 10 is from the first rigid pipe 12 to the second rigid pipe 14.

Referring to FIG. 2, the preferred embodiment incorporates at least two seals 26. It will be understood that a single seal 26 is useful in certain embodiments. With a second seal 26, the alignment between the first and second rigid pipes 12,14 is stabilized. The seals 26 are O-ring gaskets and are fabricated from conventional materials such as silica, nylon, Teflon®, and the like. A preferred seal 26 is a silica braid gasket.

The first rigid pipe 12 defines a first diameter. The distal end 16 of the first rigid pipe 12 defines a radial recess 18 for receiving and maintaining the position of each seal 26. The depth of each radial recess 18 is approximately equal to the radius of the seal 26 when in an uncompressed state. A preferred spacing between the radial recesses 18 is between one and two times the diameter of the first rigid pipe 12.

The second rigid pipe 14 defines the first diameter. However, in order to be received over the distal end 16 of the first rigid pipe 12 and the seals 26 received thereon, the proximal end 20 of the second rigid pipe 14 is expanded to define a collar 22 having a second diameter. The length of the collar 22 is dimensioned to receive each of the seals 26 when the first rigid pipe distal end 16 is inserted into the collar 22 of the second rigid pipe 14. The proximal end 20 of the second rigid pipe 14 terminates in an outwardly extending flange 24. After the first rigid pipe 12 is received within the second rigid pipe 14, the collar 22 is swaged to a third diameter, as illustrated in FIG. 3. As the collar 22 is being swaged, each seal 26 is compressed to approximately 60% of its uncompressed cross-sectional area.

The connection 10 as illustrated defines a gap 30 between the distal end 16 of the first rigid pipe 12 and the collar 22 of the second rigid pipe 14, both before and after swaging of the collar 22. The gap 30 allows for thermal expansion and contraction of the first and second rigid pipes 12,14. Linear movement between the first and second rigid pipes 12,14 is limited only by the compressed seals 26. While it is possible to disengage the first and second rigid pipes 12,14, the compressed seals 26 create sufficient force to prevent disengagement under normal operating conditions in low-pressure applications.

Figure 4:
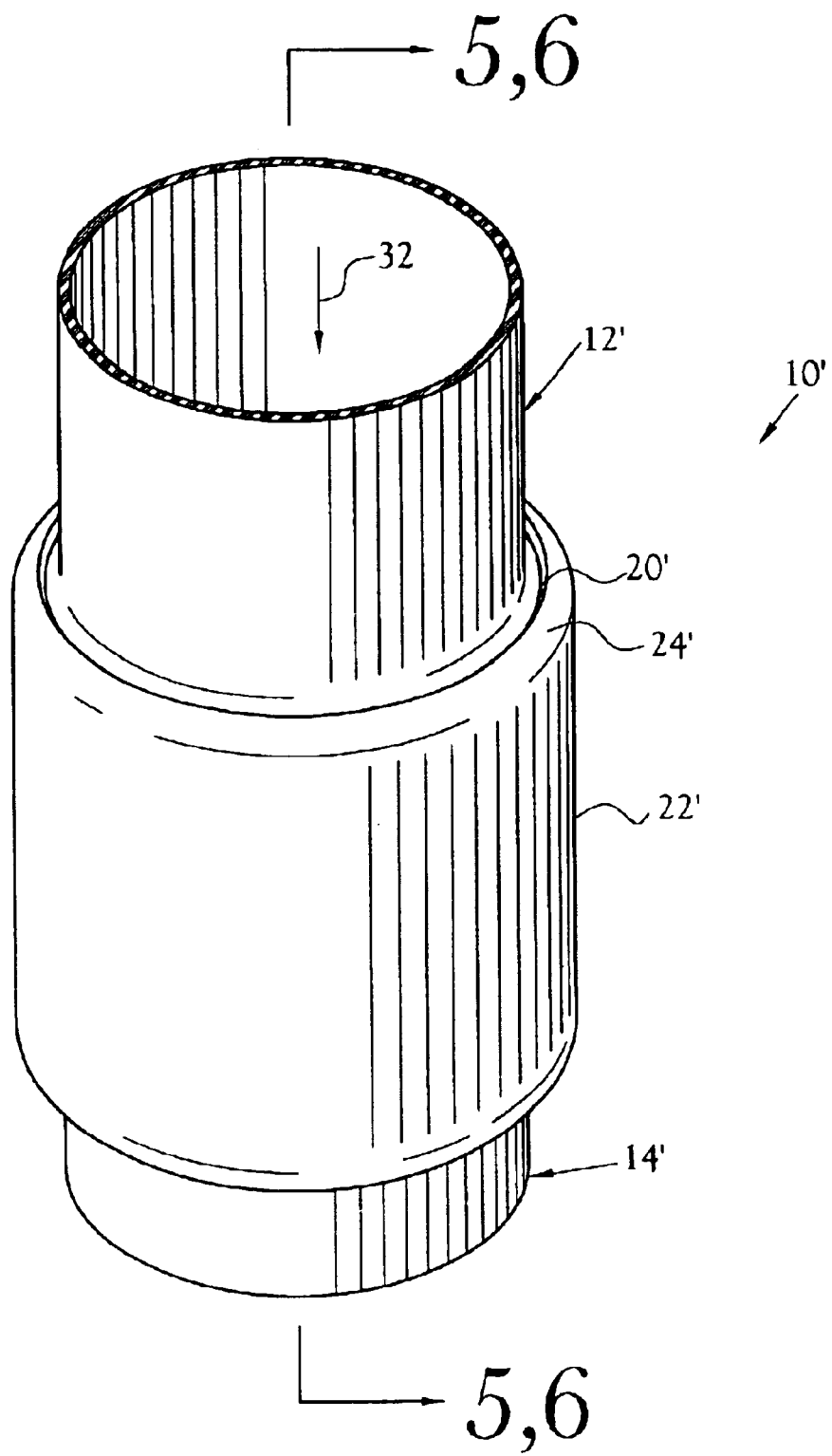
FIG. 4 is a perspective illustration of an alternate embodiment of the thermal expansion connection for rigid pipes constructed in accordance with several features of the present invention.
Figures 5, 6:
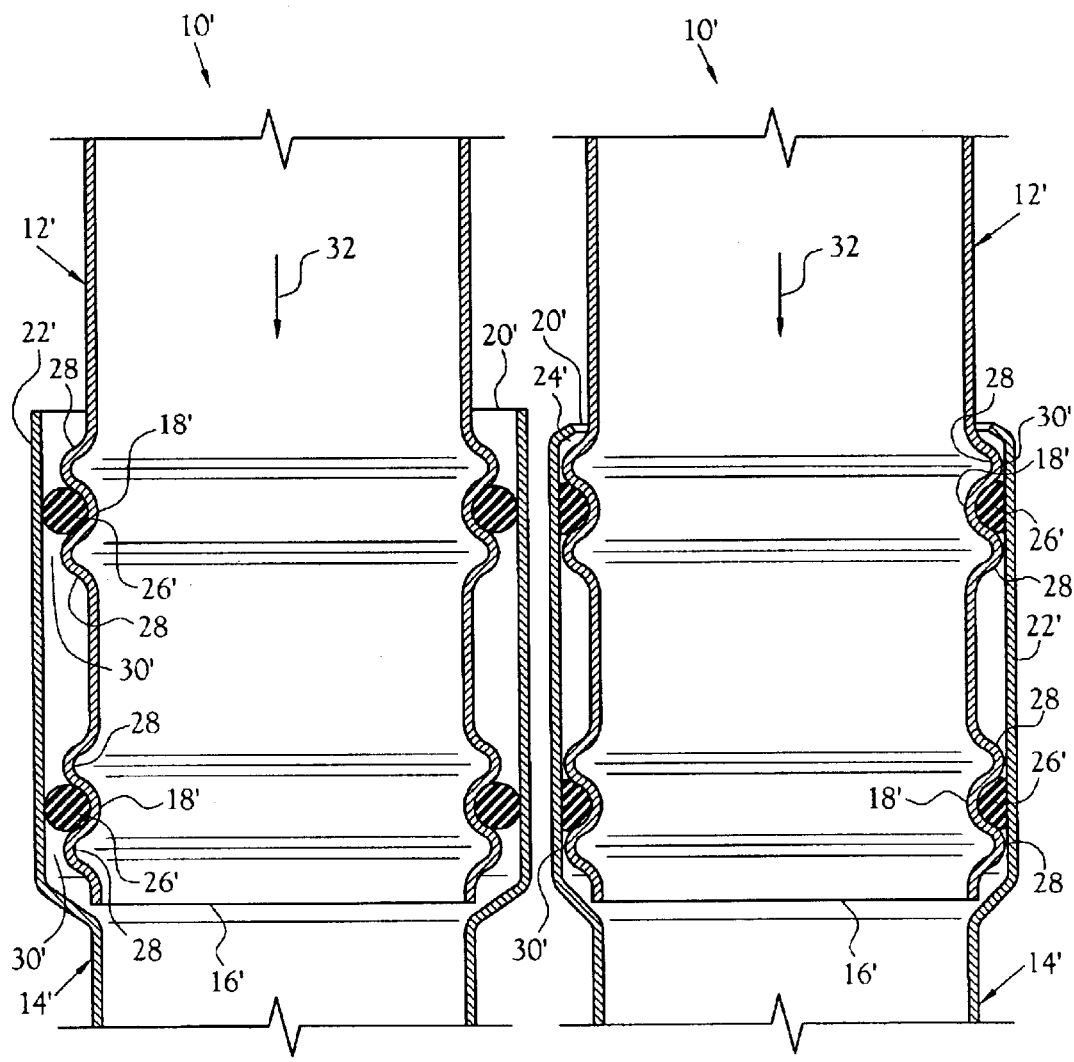
FIG. 5 is an elevation view, in section taken along lines 5—5 of FIG. 4, of the alternate embodiment of the thermal expansion connection of the present invention.
FIG. 6 is an elevation view, in section taken along lines 6—6 of FIG. 4, of the alternate embodiment of the thermal expansion connection of the present invention.

Illustrated at 10' in FIGS. 4–6 is an alternate embodiment of the present invention. Similar to the previously described embodiment, the connection 10' is formed between the distal end 16' of a first rigid pipe 12' and the proximal end 20' of a second rigid pipe 14', with the direction of flow through the connection 10' being from the first rigid pipe 12' to the second rigid pipe 14'.

Referring to FIG. 5, the distal end 16' of the first rigid pipe 12' defines a plurality of radial beads 28. A radial recess 18' is defined between a pair of spaced apart radial beads 28 to retain each seal 26'. The height of the radial beads 28, and thus the depth of each radial recess 18', is approximately equal to the radius of the seal 26' when in an uncompressed state. As a result of the radial beads 28, the air flow is less restricted through the distal end 16' of the first rigid pipe 12', as compared to the embodiment of FIGS. 1–3.

Each of the first and second rigid pipes 12',14' defines a first diameter. The second rigid pipe 14' defines a collar 22' having a second diameter. The length of the collar 22' is dimensioned to receive each of the seals 26' when the first rigid pipe distal end 16' is inserted into the collar 22' of the second rigid pipe 14'. After the first rigid pipe 12' is received within the second rigid pipe 14', the collar 22' is swaged to a third diameter, as illustrated in FIG. 6. The proximal end 20' of the second rigid pipe 14' is then swaged to terminate in an inwardly extending flange 24', thereby substantially preventing removal of the first rigid pipe 12' from within the second rigid pipe 14'.

The connection 10' as illustrated defines a gap 30' between the radial beads 28 defined in the distal end 16' of the first rigid pipe 12' and the collar 22' of the second rigid pipe 14'. The gap 30' serves the same function as in the previously-described embodiment.

From the foregoing description, it will be recognized by those skilled in the art that a thermal expansion connection for rigid pipes offering advantages over the prior art has been provided. Namely, the connection is provided for low-pressure applications subject to thermal expansion and shrinkage such as with caustic gases and diesel gas exhaust.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of the general inventive concept.

What is claimed is:

1. A thermal expansion connection for connecting a first rigid pipe to a second rigid pipe, each of the first and second rigid pipes defining a first diameter, said thermal expansion connection comprising:
   a distal end defined by said first rigid pipe;
   at least one seal disposed on said first rigid pipe distal end; and
   a proximal end defined by said second rigid pipe, said proximal end defining a collar defining a second diameter dimensioned to receive said first rigid pipe distal end and said at least one seal disposed on said first rigid pipe distal end, whereby a gap is defined between said first rigid pipe distal end and said second rigid pipe collar, and whereby a dynamic connection is formed to permit linear movement between said first rigid pipe and said second rigid pipe.

2. The thermal expansion connection of claim 1 wherein said at least one radial recess is defined between a pair of radial beads for receiving said at least one seal.

3. The thermal expansion connection of claim 1 wherein said second rigid pipe collar terminates in an outwardly extending flange.

4. The thermal expansion connection of claim 1 wherein said second rigid pipe collar terminates in an inwardly extending flange.

5. A thermal expansion connection for connecting a first rigid pipe to a second rigid pipe, each of the first and second rigid pipes defining a first diameter, said thermal expansion connection comprising:
   a distal end defined by said first rigid pipe, said first rigid pipe distal end defining a first radial recess and a second radial recess;
   a first seal and a second seal disposed on said first rigid pipe distal end, said first seal being disposed within said first radial recess and said second seal being disposed within said second radial recess, said first and second radial recess defining a depth approximate a radius of said first and second seals; and
   a proximal end defined by said second rigid pipe, said proximal end defining a collar defining a second diameter dimensioned to receive said first rigid pipe distal end and said first and second seals disposed on said first rigid pipe distal end, whereby a gap is defined between said first rigid pipe distal end and said second rigid pipe collar, and whereby a dynamic connection is formed to permit linear movement between said first rigid pipe and said second rigid pipe, said second rigid pipe collar being swaged to compress said first and second seals to prevent extraction of said first rigid pipe distal end from within said second rigid pipe collar.

6. The thermal expansion connection of claim 5 wherein each of said first and second radial recesses is defined between a pair of radial beads for receiving each of said first and second seals.

7. The thermal expansion connection of claim 5 wherein said second rigid pipe collar terminates in an outwardly extending flange.

8. The thermal expansion connection of claim 5 wherein said second rigid pipe collar terminates in an inwardly extending flange.

9. A thermal expansion connection for connecting a first rigid pipe to a second rigid pipe, each of the first and second rigid pipes defining a first diameter, said thermal expansion connection comprising:
   a distal end defined by said first rigid pipe, said first rigid pipe distal end defining a first radial recess and a second radial recess;
   a first seal and a second seal disposed on said first rigid pipe distal end, said first seal being disposed within said first radial recess and said second seal being disposed within said second radial recess, said first and second radial recess defining a depth approximate a radius of said first and second seals, wherein each of said first and second radial recesses is defined between a pair of radial beads for receiving each of said first and second seals; and
   a proximal end defined by said second rigid pipe, said proximal end defining a collar defining a second diameter dimensioned to receive said first rigid pipe distal end and said first and second seals disposed on said first rigid pipe distal end, whereby a gap is defined between said first rigid pipe distal end and said second rigid pipe collar, and whereby a dynamic connection is formed to permit linear movement between said first rigid pipe and said second rigid pipe, said second rigid pipe collar being swaged to compress said first and second seals to prevent extraction of said first rigid pipe distal end from within said second rigid pipe collar, said second rigid pipe collar terminating in an inwardly extending flange.

* * * * *